US012761894B1

(12) United States Patent
Bernabe et al.

(10) Patent No.: US 12,761,894 B1
(45) Date of Patent: Oct. 13, 2026

(54) CUSTOM PRIVATE SOFTWARE CHANNELS FOR A CLIENT DEVICE

(71) Applicant: Zoom Communications, Inc., San Jose, CA (US)

(72) Inventors: William Thomas Bernabe, Northborough, MA (US); Benjamin Joseph DeStephen, Hilliard, OH (US)

(73) Assignee: Zoom Communications, Inc., San Jose, CA (US)

( * ) Notice: Subject to any disclaimer, the term of this patent is extended or adjusted under 35 U.S.C. 154(b) by 132 days.

(21) Appl. No.: 18/422,647

(22) Filed: Jan. 25, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS 6,353,926 B1 * 3/2002 Parthesarathy ........... G06F 8/65 707/999.203
7,003,767 B2 * 2/2006 Larkin .................... G06F 8/656 717/172
7,305,672 B2 * 12/2007 Vincent ................... G06F 8/656 717/172
8,285,688 B2 10/2012 Krishnaswamy et al.
9,448,780 B1 9/2016 Hall
11,237,817 B2 * 2/2022 Shantharam .............. G06F 8/61
11,675,800 B2 * 6/2023 Desai .................. G06F 16/9035 707/769
2006/0148063 A1 * 7/2006 Fauzzi ..................... G01N 1/31 422/65
2008/0263439 A1 * 10/2008 Oz ........................ G06F 16/958 707/E17.116
2008/0301660 A1 * 12/2008 Rao ........................... G06F 8/65 717/170
2009/0133012 A1 * 5/2009 Shih ................... H04N 21/6543 717/169
2009/0138477 A1 * 5/2009 Piira ....................... H04L 67/34
2011/0035741 A1 2/2011 Thiyagarajan
2015/0113261 A1 * 4/2015 Srinivasan ............ G06F 9/4406 713/100

(Continued)

FOREIGN PATENT DOCUMENTS

CA 3165696 A1 * 7/2021 ........... H04L 63/104
CN 101188740 A * 5/2008

(Continued)

*Primary Examiner* — Philip Wang
(74) *Attorney, Agent, or Firm* — Young Basile Hanlon & MacFarlane P.C.

(57) ABSTRACT

Custom private channels are provided for updating a versioned software application installed on one or more client devices. A client device is configured with a channel identifier that is associated with one or more versions of the software application. The client device queries an update server from time to time to determine what version of the software application should be installed on the client device according to the channel identifier, and the client device requests installation files, or links thereto, from the update server if the client device determines its currently installed version is out of date.

20 Claims, 9 Drawing Sheets

(56) References Cited

U.S. PATENT DOCUMENTS

| | | | | |
|---|---|---|---|---|
| 2015/0128122 | A1* | 5/2015 | Wang | G06F 8/65 717/170 |
| 2017/0102976 | A1* | 4/2017 | Nandakumar | G06F 8/60 |
| 2020/0364038 | A1* | 11/2020 | Huang | G06F 8/65 |
| 2021/0258308 | A1* | 8/2021 | Avetisov | H04L 9/0825 |
| 2023/0386657 | A1* | 11/2023 | Pascal | G16H 40/67 |
| 2024/0220277 | A1* | 7/2024 | Pyle | G06F 9/44505 |
| 2025/0085955 | A1* | 3/2025 | Miroshkin | G06F 8/65 |
| 2025/0291302 | A1* | 9/2025 | Okamura | G03G 15/0867 |

FOREIGN PATENT DOCUMENTS

| | | | | | |
|---|---|---|---|---|---|
| CN | 102387165 | B | | 11/2014 | |
| CN | 106464597 | A | * | 2/2017 | H04W 24/02 |
| JP | 2021144485 | A | * | 9/2021 | |

* cited by examiner

CUSTOM PRIVATE SOFTWARE CHANNELS FOR A CLIENT DEVICE

FIELD

This disclosure generally relates to channels for updating versioned software, and more specifically, to custom private channels for updating versioned software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
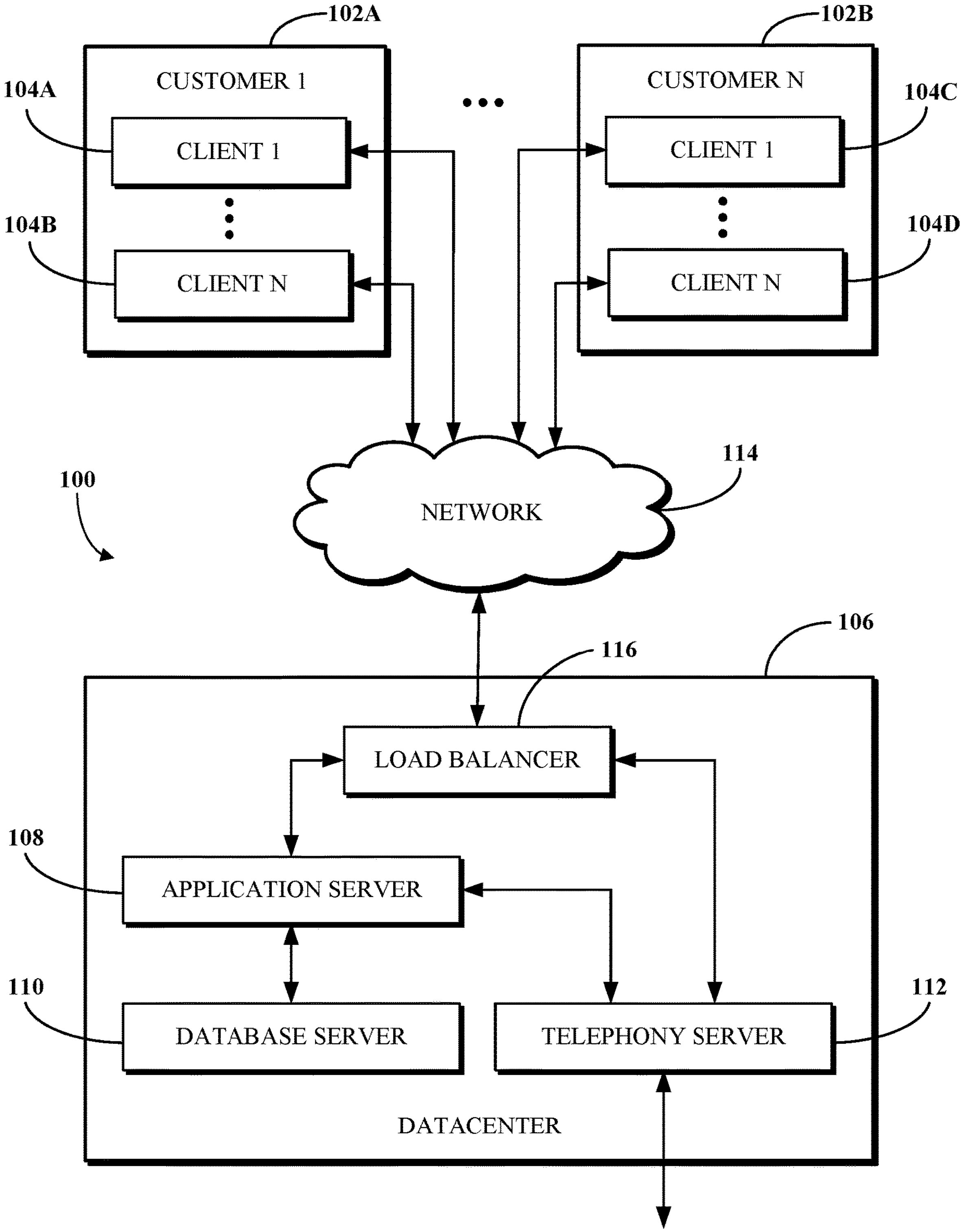
FIG. 1 is a block diagram of an example of an electronic computing and communications system.

Software applications that are installed on a client device, such as a computer or mobile device, may be updated from time to time, for example, to enable new features or to fix software bugs. There are several paradigms concerning the timing of updates. In a fully manual paradigm, updates only occur when they are initiated by a user or administrator of the client device. Although fully manual updates afford maximum control to the user or administrator of the client device, there is a risk that important updates, such as critical security updates, may never be installed by the user or administrator of the client device. In a fully automatic paradigm, updates may occur whenever they are initiated by a provider of a software application. Although fully automatic updates ensure that a latest version of a software application is installed on the client device, there is a risk that the latest version does not perform as intended, for example, due to instability or incompatibility with other software applications or certain hardware configurations.

Some software providers have adopted a hybrid paradigm concerning software-application updates, where a user or administrator of a client device can select from among several automatic-update channels. For example, selecting a "fast" automatic-update channel may cause the software application to be automatically updated with the very latest versions as they become available, such as "beta" versions. In contrast, selecting a "slow" automatic-update channel may cause the software application to be automatically updated with older and more robust "release" versions. Although this hybrid update paradigm addresses the risk of missing critical updates, it does not enable an administrator of several client devices to select a specific version for each automatic-update channel or to select different automatic-update channels for different client devices. For example, in an enterprise organization, it may be beneficial for client devices in an information technology (IT) department to always use the latest versions (e.g., for testing stability and compatibility), while it may be beneficial for client devices in a sales department to use more stable or reliable versions (e.g., for communicating with customers).

Implementations of the disclosed technology address several of the aforementioned limitations concerning software-application updates. An administrator of a software application, e.g., an IT administrator in an enterprise organization, can utilize a simple configuration GUI provided by a software-application provider to create and define one or more software-application update channels. The administrator can enter an alphanumeric string to name each channel, for example, "Test Users," "Production," and so on, and the administrator can select a respective software-application version for each channel. The administrator additionally determines which client devices belong to which channels and configures the client devices accordingly using a suitable configuration technique (e.g., a group policy object (GPO) or Microsoft standard installer (MSI) flag on a Windows client or a property list (PLIST) on a Macintosh client). Thus, when each configured client device checks its currently installed version of the software application (e.g., when the software application launches (starts up), when the client device boots up, or at predefined intervals), the client device queries an update server according to its assigned channel and receives from the update server an indication of the version that was specified for that channel by the administrator via the configuration GUI. The client device can subsequently request installation files, or links thereto, from the update server for the specified version. In some implementations, the administrator of the software application can configure the software application installed on respective client devices to allow a user or administrator of a respective client device to select which update channel to subscribe to.

In some implementations, the configuration GUI allows the administrator to select, for each update channel, a version of the software application that is specific to an operating system installed on a respective client device, such that when the respective client device requests the version corresponding to its assigned channel, it can receive the version corresponding to the correct operating system. In some implementations, the available versions that are presented to the administrator in the configuration GUI are determined by policies of the software-application provider, for example, only versions that were released within a predefined date range, such as within the last nine months, are presented. Although the disclosed technology is applicable to video conferencing software within a software platform, such as a unified communications as a service (UCaaS) platform, it is beneficial to most versioned software applications that are installed on client devices, for example, computer-aided drafting (CAD) or office productivity.

To describe some implementations in greater detail, reference is first made to examples of hardware and software structures used to implement a system for implementing custom private software channels. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as those of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated with or communicate with a customer network or domain for the customer 102A, and the clients 104C through 104D can be associated with or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include one or more customers and/or clients, and it can include a configuration of customers or clients different from that generally illustrated in FIG. 1. For example, and without limitation, the system 100 can include hundreds or thousands of customers, and at least some of the customers can include or be associated with one or more clients.

The system 100 includes a datacenter 106, which may include one or more servers. The datacenter 106 can represent a geographic location, which can include a facility, where the one or more servers are located. The system 100 can include one or more datacenters and servers, and it can include a configuration of datacenters and servers different from that generally illustrated in FIG. 1. For example, and without limitation, the system 100 can include tens of datacenters, and at least some of the datacenters can include hundreds or thousands of servers. In some implementations, the datacenter 106 can be associated with or communicate with one or more datacenter networks or domains, which can include domains other than the customer domains for the customers 102A through 102B.

The datacenter 106 includes servers used for implementing software services of a UCaaS platform. The datacenter 106, as generally illustrated, includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable quantity of each of the servers 108 through 112 can be implemented at the datacenter 106. The UCaaS platform can use a multi-tenant architecture in which installations or instantiations of the servers 108 through 112 are shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed to deliver software services to a client, such as one of the clients 104A through 104D, as part of a software application. The application node can be implemented using processing threads, virtual machine instantiations, or other computing features of the application server 108. In some such implementations, the application server 108 can include a suitable quantity of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired (e.g., electrical or optical), wireless (e.g., electromagnetic, optical), use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
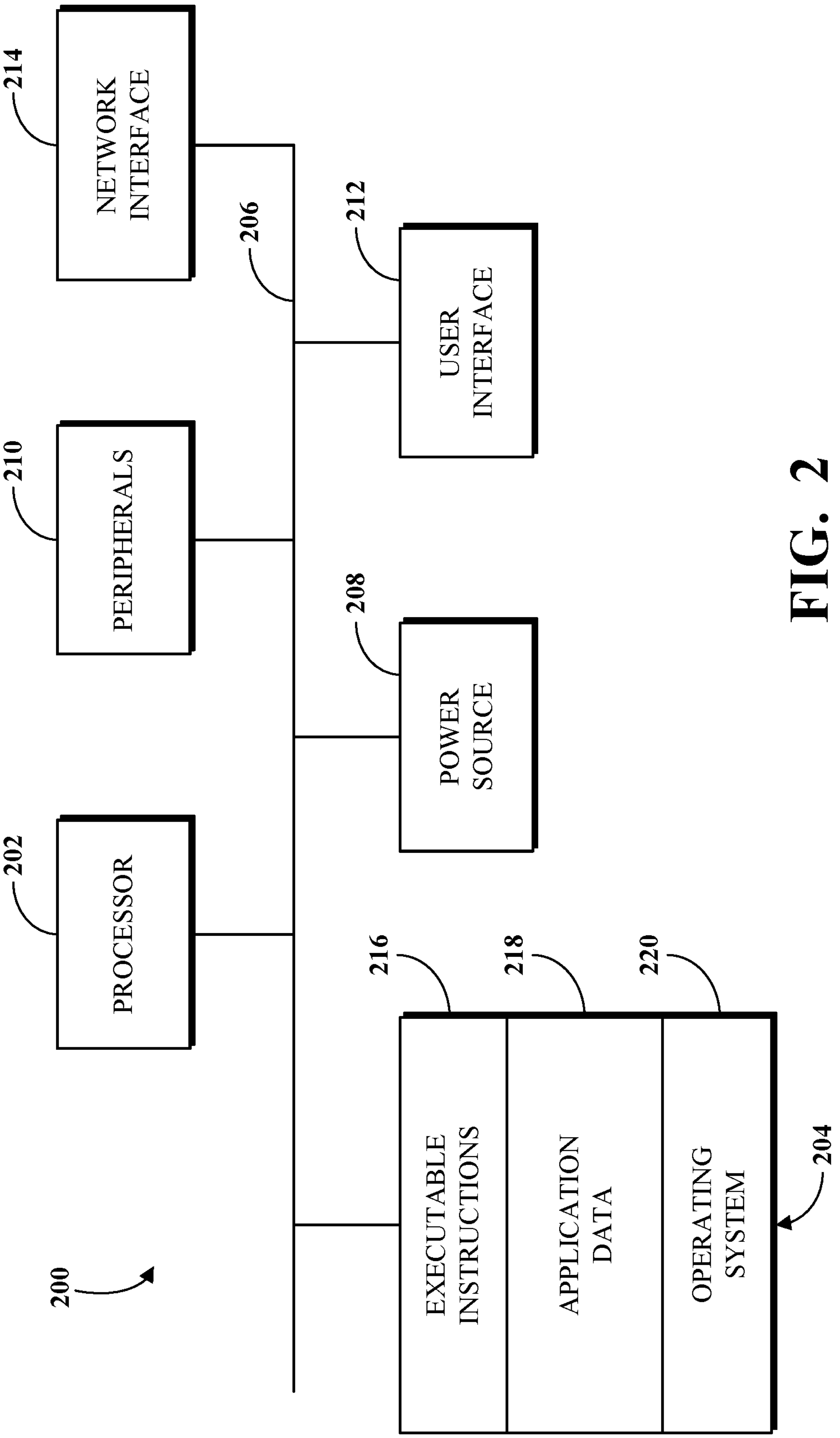
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
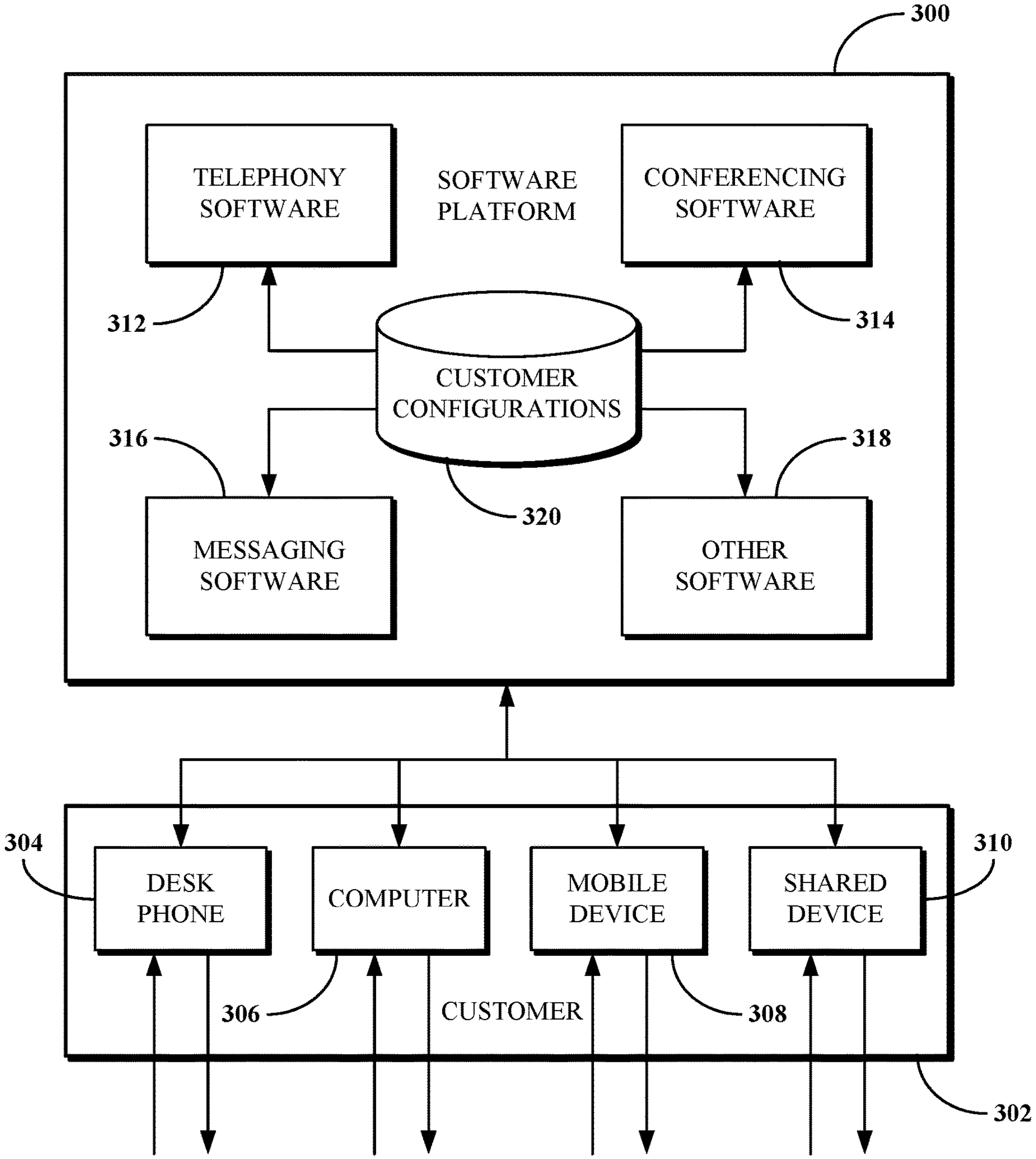
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients: a client 304, a client 306, a client 308, and a client 310 (i.e., clients 304 through 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which case the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one example, the other software 318 can execute instructions for implementing custom private software channels, including instructions for presenting configuration GUIs to a user or administrator and instructions for delivering installation files, or links thereto, for an identified version of a software application for installation on a client device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310. Terms "run" and "execute" as used herein with reference to software may be synonymous.

Figure 4:
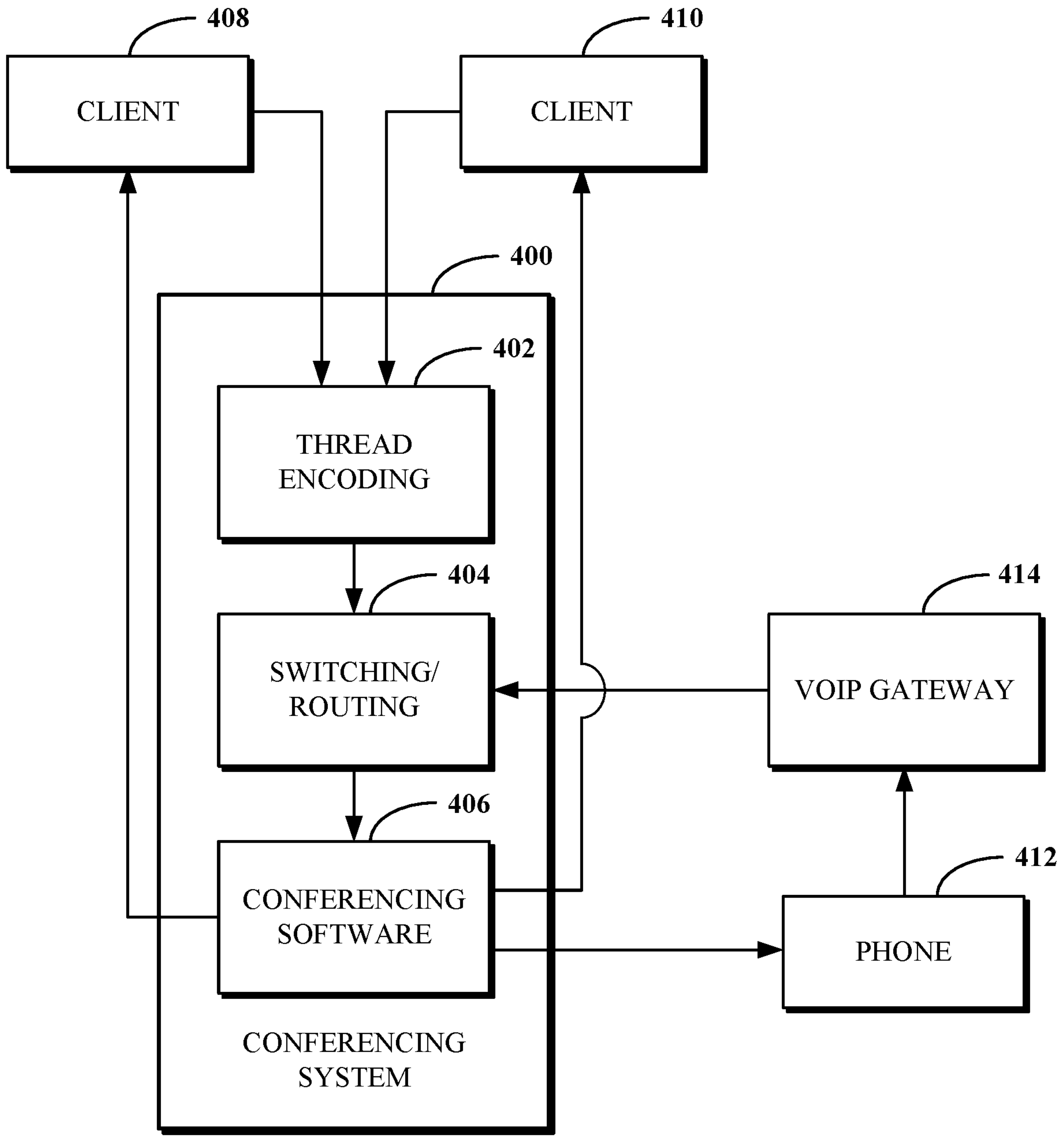
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may be, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other quantities of clients and/or other quantities of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A "user interface tile" as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and/or arranged in a center position of the conferencing software user interface while the user interface tiles for other conference participants are reduced in size and/or arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspects since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining via clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
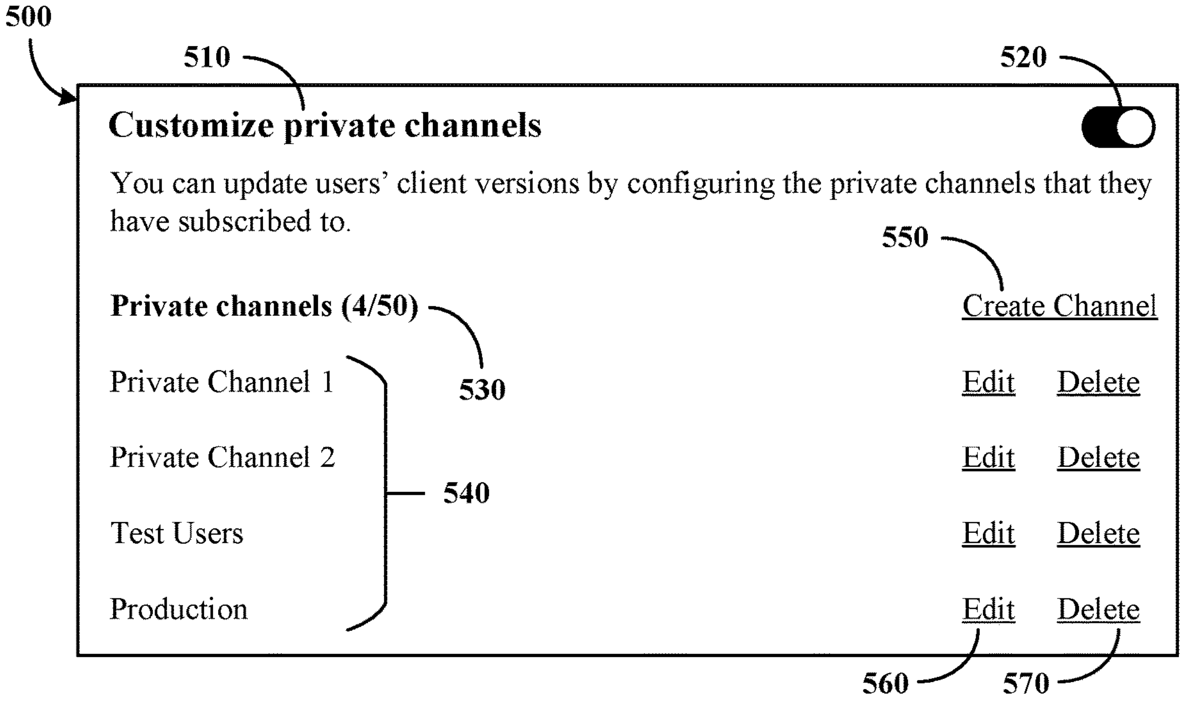
FIG. 5 is an example of a graphical user interface (GUI) for displaying configured custom private software channels.

FIG. 5 shows an example of a GUI 500 for displaying configured custom private software channels. Several similar terms may be used interchangeably herein to refer to a channel for updating a version of a software installed on a client device, for example, "channel," "private channel," "custom private channel," "software channel," "private software channel," "software update channel," and "update channel." The GUI 500 may be presented to an administrator by a graphical display that may be implemented by the user interface 212 of the computing device 200 of FIG. 2. The GUI 500 includes a title 510, "Custom private channels," to indicate to the administrator that the GUI 500 displays channels that have already been configured (e.g., configured previously by the administrator, by another administrator, or by default). Beneath the heading 530, "Private channels (4/50)" are listed four channels 540 that have been named "Private Channel 1," "Private Channel 2," Test Users," and "Production." The quantity of channels and their names are by way of example only. In some implementations, channel names are determined by the administrator as described further below. An "Edit" option 560 and a "Delete" option 570 are provided for each channel of the channels 540 so that the administrator may edit or delete the corresponding channel, respectively. To add a new channel, the administrator can select the "Create Channel" option 550. In some implementations, a radio button 520 is provided in the GUI 500 for enabling or disabling all channels that have been configured, where disabling all channels means that client devices that have been configured to receive software version updates via one of these channels will no longer receive such updates until the private channels are re-enabled.

Figure 6:
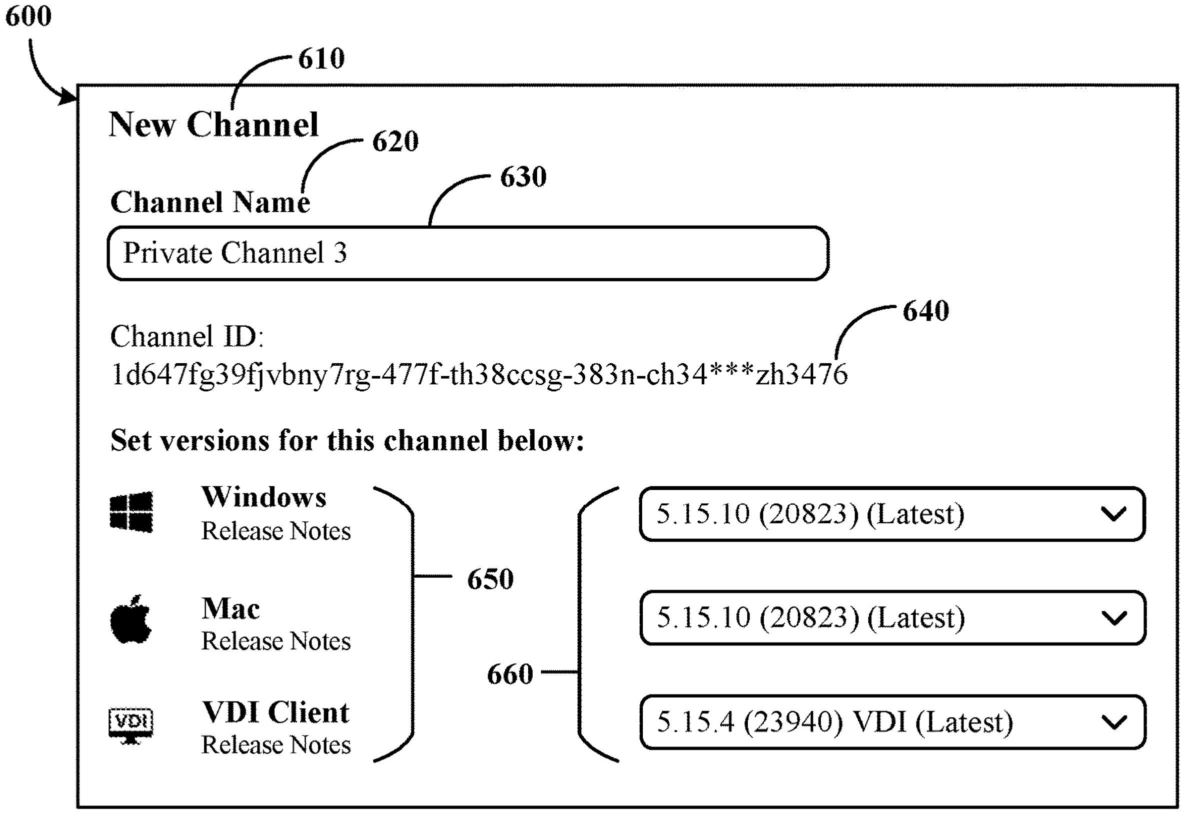
FIG. 6 is an example of a GUI for configuring a custom private software channel.

FIG. 6 shows an example of a GUI 600 for configuring a private software channel that may be presented to an administrator following the administrator's selection of the "Create Channel" option 550 of FIG. 5. The GUI 600 may be presented to an administrator by a graphical display that may be implemented by the user interface 212 of the computing device 200 of FIG. 2. The GUI 600 includes a title 610, "New Channel," to indicate to the administrator that the GUI 600 may be used for configuring a new channel (or for reconfiguring an existing channel). Beneath the heading 620, "Channel Name" is a text-entry field 630 for entry of alphanumeric text for naming the new channel. The term "alphanumeric" as used herein may include letters, numbers, spaces, and special characters. In the example GUI 600, the name of the new channel is "Private Channel 3."

Beneath the text-entry field 630 is an example of a channel identifier, or channel ID, 640. In some implementations, the channel ID 640 is an alphanumeric string that is determined by software, for example, the software 318 of FIG. 3, executing on an update server, for example, an instance of the application server 108 and/or the database server 110 of FIG. 1. Whereas the channel name may be an easily readable (human-readable) alphanumeric string, the channel identifier may be a long string of random characters. In some implementations, the channel identifier may be determined randomly or pseudo-randomly. The update server associates the channel identifier with the newly created channel, such that the update server can later determine, or lookup, configuration settings for the newly created channel based on the channel identifier.

A bottom portion of the GUI 600 shows three examples of operating systems 650 that may be installed on a client device, and for each operating system 650, a corresponding version 660 of a software application for installation on the client device according to the operating system installed on the client device. By using the GUI 600, the administrator can select a version 660 of the software application for each operating system 650, for example, via a pulldown menu. In some implementations, the available versions 660 that are presented to the administrator are determined by policies of the software-application provider, for example, only versions that were released within the last nine months are presented to the administrator for selection.

Figure 7:
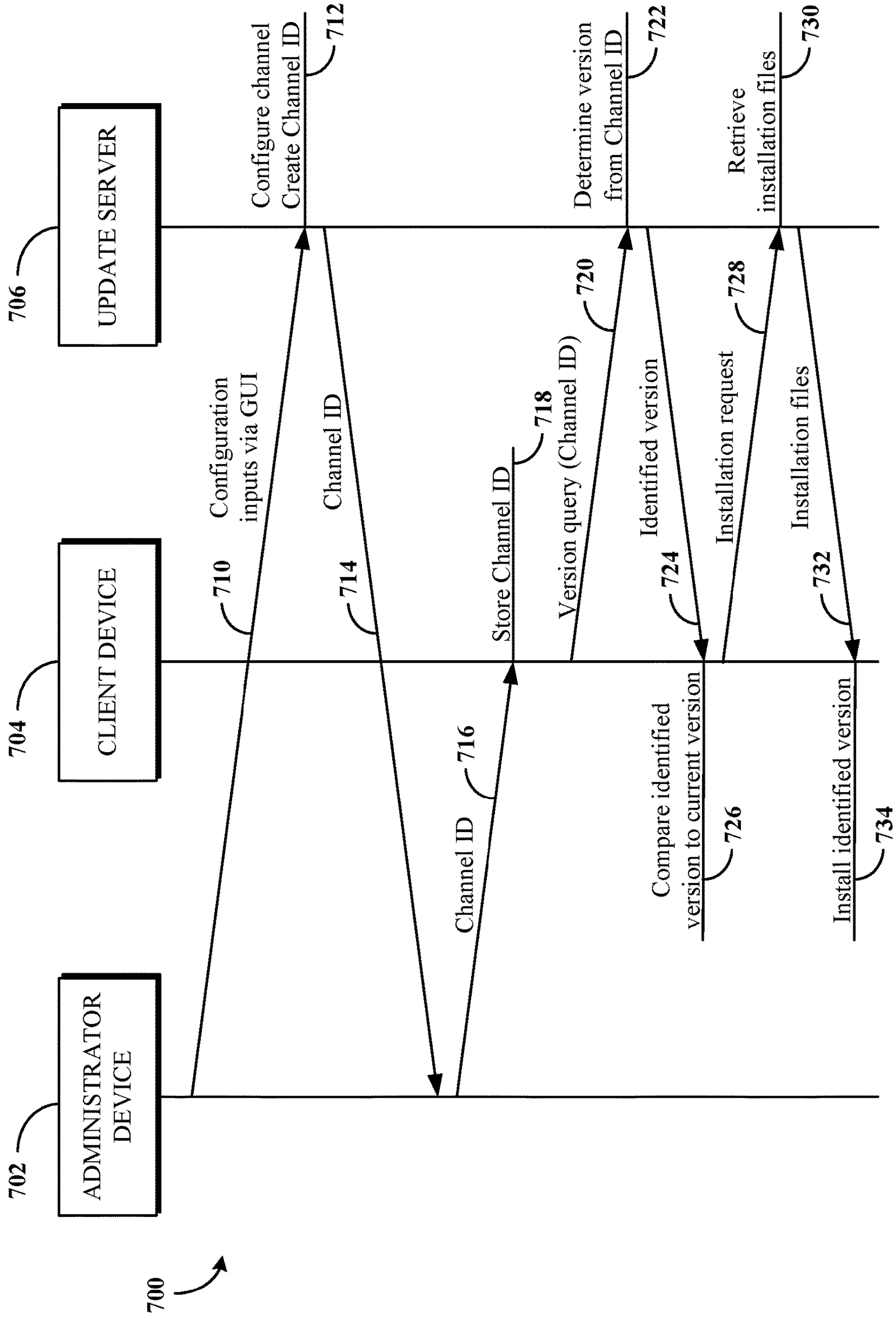
FIG. 7 is a time-space diagram of an example of configuring and using custom private software channels.

FIG. 7 shows a time-space diagram of an example of a system 700 for configuring and using custom private software update channels for updating a software application installed on one or more client devices 704. An administrator device 702 operated by an administrator, for example an administrator of the software application, provides configuration inputs 710 via a GUI served by the update server 706. The GUI may be the GUI 600 of FIG. 6, and the configuration inputs 710 may be one or more inputs for configuring a channel name in the text-entry field 630 and at least one software version 660. The update server 706 may be a server such as the application server 108 and/or the database server 110 of FIG. 1. The update server 706 receives the configuration inputs 710 from the administrator device 702 via the GUI and configures a custom private software update channel accordingly, which includes a step 712 of creating a channel identifier, or Channel ID, and associating the channel identifier with the newly configured channel.

The step 714 shows the administrator device 702 acquiring the channel identifier from the update server 706, which step 714 may include the update server 706 presenting the channel identifier to the administrator operating the administrator device 702 via the GUI (e.g., enabling the administrator to copy-and-paste the channel identifier), or it may include the update server 706 sending a message to the administrator device 702, for example, an email, a text message, or a file, that contains the channel identifier.

In a next step 716, the administrator device 702 configures the client device 704 with the channel identifier, which the client device 704 saves to a memory as indicated by step 718, for example, to the memory 204 of the computing device 200 of FIG. 2. The steps 716 and 718 (i.e., configuring the client device 704 with the channel identifier) may be achieved via a suitable configuration technique, such as a GPO or an MSI flag for a Windows client or a PLIST for a Macintosh client. While the system 700 only shows a single client device 704, there may be multiple clients that require configuration. Some clients may be configured with a first channel identifier, other clients may be configured with a second channel identifier, and so on, where each channel identifier would be created as described above. Clients configured with a given channel identifier will receive the same software installation files, or links thereto, from the update server (notwithstanding differences in operating systems), as explained below.

From time to time, the client device 704 checks whether its currently installed version of the software application matches the version that has been configured for its custom private software channel. For example, the client device 704 may perform this check when the software application launches (starts executing) on the client device 704, when the client device 704 boots up, at predefined intervals such as every 24 hours, and so on. To perform this check, the client device 704 sends a version query 720 to the update server 706. The version query 720 includes the channel identifier. In a step 722, the update server 706 determines (or identifies), based on the configuration settings of the update channel associated with the received channel identifier, what version of the software application should be installed on the client device, or more precisely, what version of the software application should be installed for any client device configured with the received channel identifier (notwithstanding differences in operating systems). This version may be referred to herein as the "identified version." In a step 724, the update server 706 sends an indication of the identified version to the client device 704. The indication may be, for example, an alphanumeric description of the identified version. In a step 726, the client device 704 compares the identified version to its currently installed version. If the identified version matches the currently installed version, the check is complete and the client device 704 need not perform immediately subsequent software-installation steps. If the identified version does not match the currently installed version, the client device 704 sends an installation request 728 to the update server 706 requesting installation files corresponding to the identified version. In a step 730, the update server 706 retrieves the installation files, and in a step 732, the update server 706 sends the installation files to the client device 704. In a step 734, the client device 704 installs the identified version of the software application using the received installation files. In some implementations (not shown in FIG. 7), the update server 706 may send an indication of the installation files, for example as a link (e.g., a universal resource locator (URL)) that indicates, or points to, a local or remote location where the client device 704 can download or otherwise access one or more of the installation files.

As indicated above, the version of the software application that should be installed on a given client device 704 may depend on the operating system that is executing on the client device 704. Thus, the version query 720 may include an indication of the operating system of the client device 704 in addition to the channel identifier. The indication of the operating system may be, for example, an alphanumeric description of the operating system.

In some implementations, the administrator device 702 does not configure the client device 704 with the channel identifier, but instead, the client device 704 is configured to allow a user or administrator of the client device 704 to select a software update channel to subscribe to. In such case, the administrator device 702 may configure the client device 704 for possible subscription to any configured software update channel or to only subset of software update channels that are appropriate for the given client device 704. The user or administrator of the client device 704 subsequently utilizes a GUI provided by the update server 706 to select a software update channel, for example, via one or more simple pulldown menus. Once the client device 704 is subscribed to a software update channel, the client device 704 may check whether its currently installed version of the software application matches the version that has been configured for the software update channel to which it is subscribed, in a manner like that described above with reference to FIG. 7.

Figure 8:
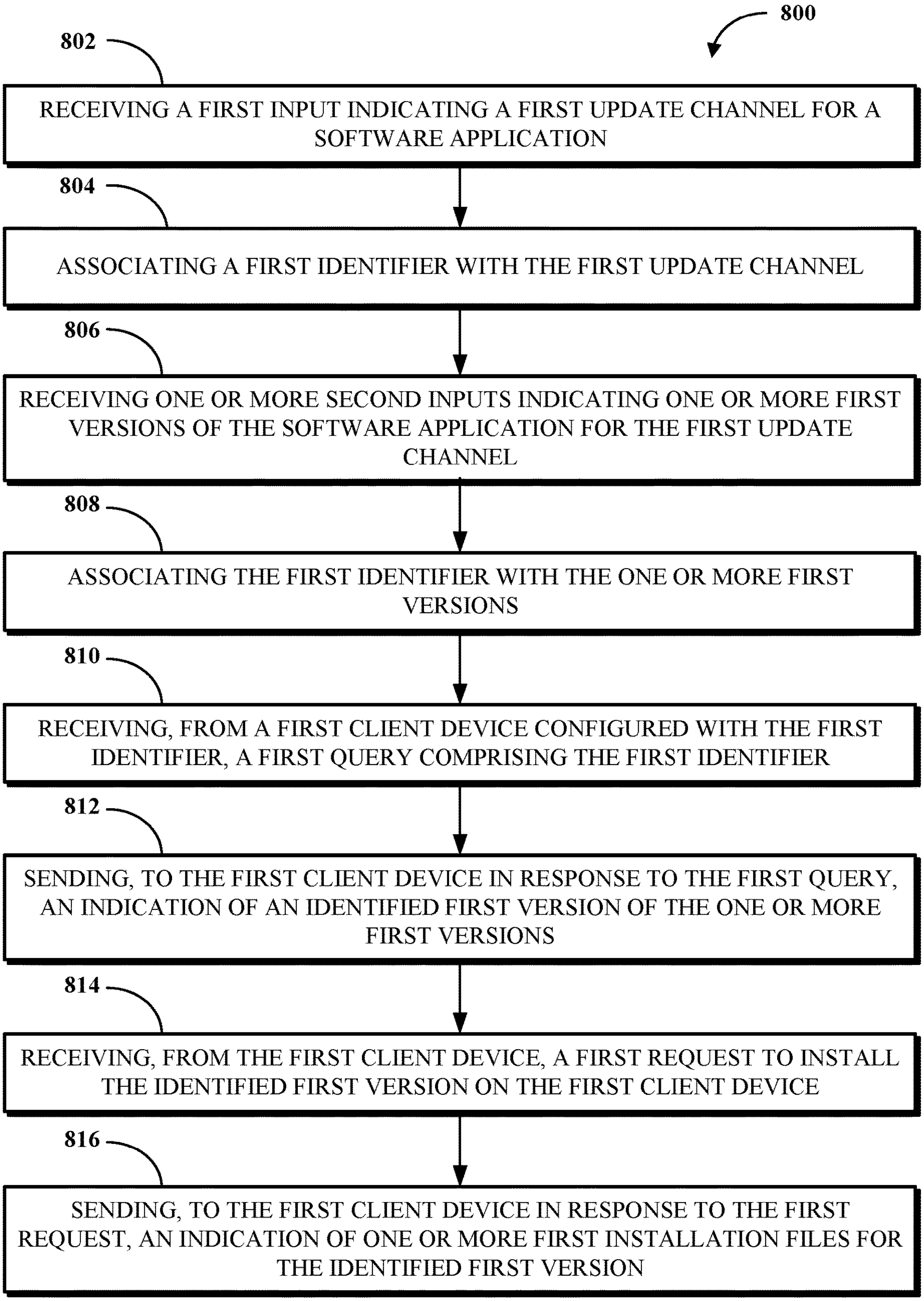
FIG. 8 is a flowchart of a first example of a technique for custom private software channels at an update server.
Figure 9:
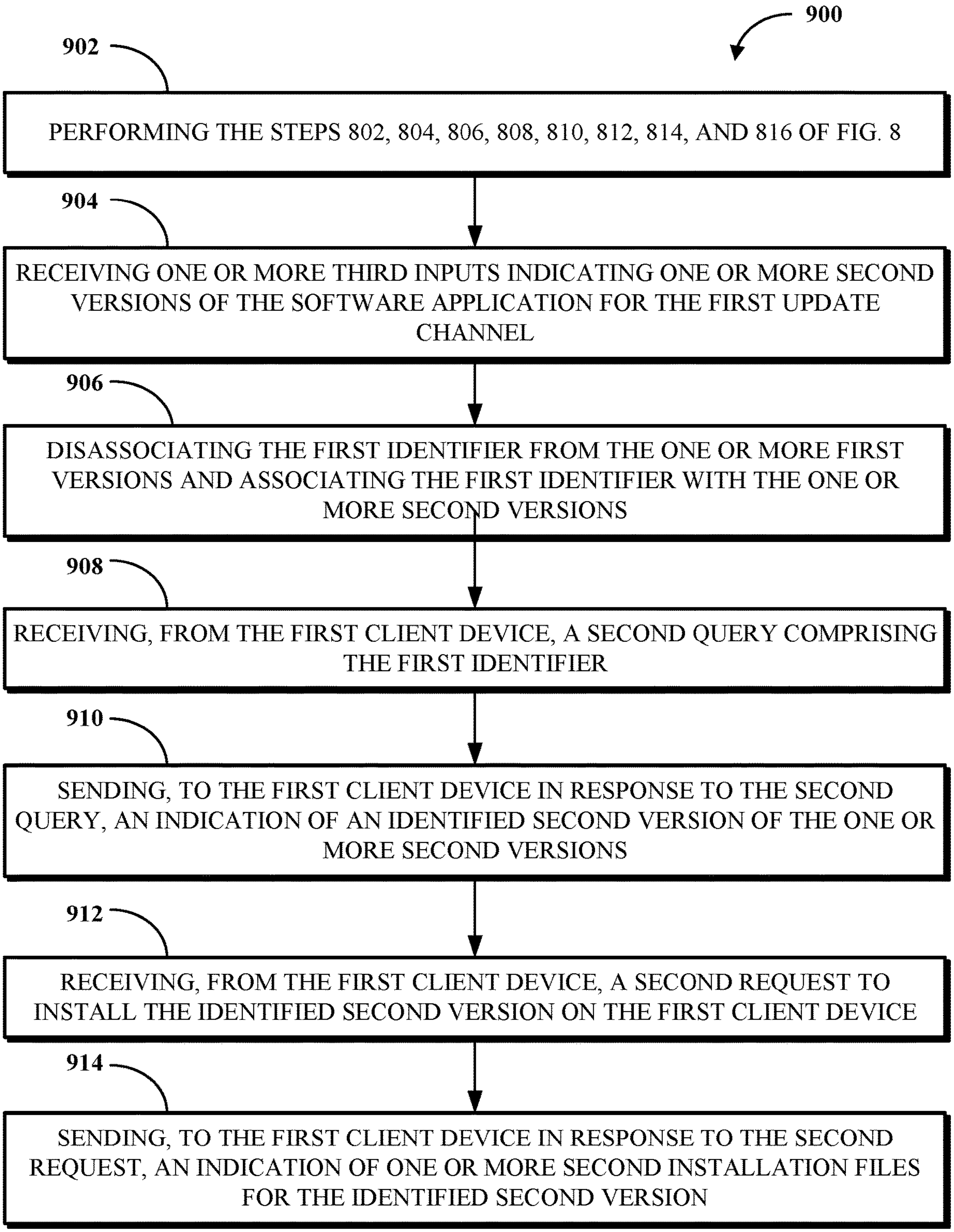
FIG. 9 is a flowchart of a second example of a technique for custom private software channels at an update server.
Figure 10:
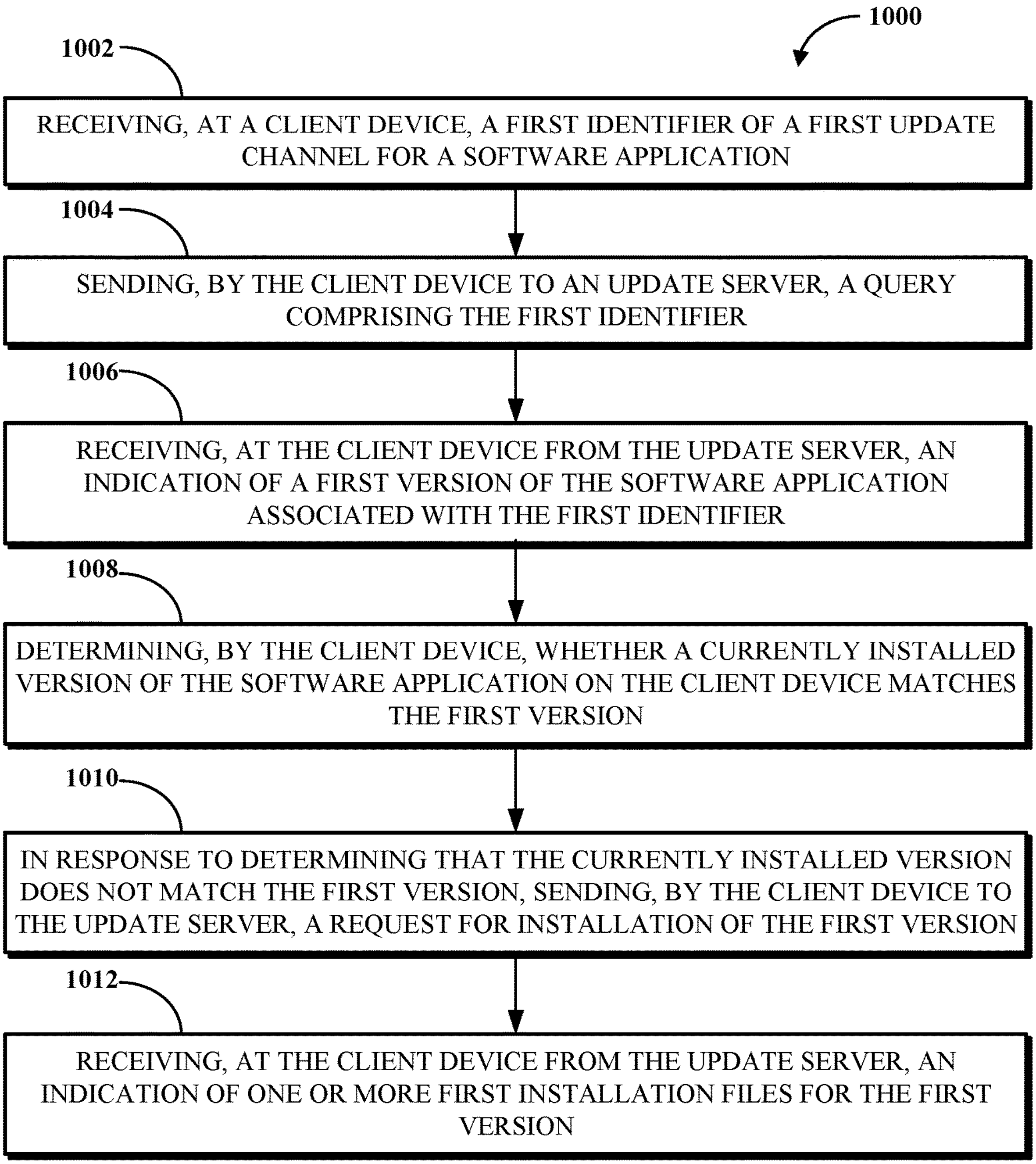
FIG. 10 is a flowchart of an example of a technique for custom private software channels at a client device.

To further describe some implementations in greater detail, reference is next made to examples of techniques 800, 900, and 1000 which may be performed by or using one or more components of a system for providing versioned software applications that are installed on client devices, for example, a video-conference system. FIGS. 8, 9, and 10 are respective flowcharts of examples of techniques for implementing custom private software update channels.

The techniques 800, 900, and 1000 can be executed using computing devices, such as the systems, hardware, and software described or referenced with respect to FIGS. 1-7. The techniques 800, 900, and 1000 can be performed, for example, by executing a machine-readable program or other computer-executable instructions, such as routines, instructions, programs, or other code. The steps, or operations, of the techniques 800, 900, and 1000, or another technique, method, process, or algorithm described in connection with the implementations disclosed herein can be implemented directly in hardware, firmware, software executed by hardware, circuitry, or a combination thereof.

For simplicity of explanation, the techniques 800, 900, and 1000 are depicted and described herein as a series of steps or operations. However, the steps or operations of the techniques 800, 900, and 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter. The techniques 800, 900, and 1000 may be performed by one or more components of video-conferencing system, which may be implemented as a UCaaS platform, such as one or more client devices, such as the computing device 200 of FIG. 2, and one or more servers, such as the application server 108 and/or the database server 110 of FIG. 1.

Referring first to FIG. 8, the step 802 comprises receiving a first input indicating a first update channel for a software application. In some implementations, an update server, which may be implemented by the application server 108 and/or the database server 110 of FIG. 1, receives the first input. In some implementations, the software application is a component of a video conferencing software platform. In some implementations, the first input comprises alphanumeric characters that represent a human-readable name of the first update channel.

The step 804 comprises associating a first identifier with the first update channel. In some implementations, the first identifier comprises a random or pseudorandom string of alphanumeric characters. In some implementations, the method further comprises generating the first identifier as a random or pseudorandom string of alphanumeric characters.

The step 806 comprises receiving one or more second inputs indicating one or more first versions of the software application for the first update channel. In some implementations, an update server, which may be implemented by the application server 108 and/or the database server 110 of FIG. 1, receives the one or more second inputs. In some implementations, the update server serves a GUI for receiving the first input and the one or more second inputs. In some implementations, each second input comprises selecting a respective first version from a respective set of currently available versions of the software application associated with a respective operating system. In some implementations, each second input indicates a first version selected from a respective set of versions of the software application, associated with a respective operating system, that was released within predefined date range.

The step 808 comprises associating the first identifier with the one or more first versions.

The step 810 comprises receiving, from a first client device configured with the first identifier, a first query comprising the first identifier. The first client device may be implemented by the computing device 200 of FIG. 2. In some implementations, receiving the first query in response to the software application launching on the first client device. In some implementations, receiving the first query in response to the first client device booting up. In some implementations, the first query is received at one or more predefined intervals. In some implementations, the first client device was configured with the first identifier via a group policy object (GPO), a Microsoft standard installer (MSI) flag, or a property list (PLIST).

The step 812 comprises sending, to the first client device in response to the first query, an indication of an identified first version of the one or more first versions. In some implementations, the indication of the identified first version comprises an alphanumeric description of the identified first version.

The step 814 comprises receiving, from the first client device, a first request to install the identified first version on the first client device.

The step 816 comprises sending, to the first client device in response to the first request, an indication of one or more first installation files for the identified first version. In some implementations, the indication of one or more first installation files comprises at least one of: one or more installation files; or one or more links to one or more installation files.

Referring now to FIG. 9, the step 902 comprises performing the steps 802, 804, 806, 808, 810, 812, 814, and 816 of FIG. 8.

The step 904 comprises receiving one or more third inputs indicating one or more second versions of the software application for the first update channel. In some implementations, an update server, which may be implemented by the application server 108 and/or the database server 110 of FIG. 1, receives the one or more third inputs. In some implementations, an update server, which may be implemented by the application server 108 and/or the database server 110 of FIG. 1, receives the one or more third inputs. In some implementations, the update server serves a GUI for receiving the one or more third inputs. In some implementations, each third input comprises selecting a respective second version from a respective set of currently available versions of the software application associated with a respective operating system. In some implementations, each third input indicates a second version selected from a respective set of versions of the software application, associated with a respective operating system, that was released within predefined date range.

The step 906 comprises disassociating the first identifier from the one or more first versions and associating the first identifier with the one or more second versions.

The step 908 comprises disassociating the first identifier from the one or more first versions and associating the first identifier with the one or more second versions. In some implementations, receiving the second query in response to the software application launching on the first client device. In some implementations, receiving the second query in response to the first client device booting up. In some implementations, the second query is received at one or more predefined intervals.

The step 910 comprises sending, to the first client device in response to the second query, an indication of an identified second version of the one or more second versions. In some implementations, the indication of the identified second version comprises an alphanumeric description of the identified second version.

The step 912 comprises receiving, from the first client device, a second request to install the identified second version on the first client device.

The step 914 comprises sending, to the first client device in response to the second request, an indication of one or more second installation files for the identified second version. In some implementations, the indication of one or more second installation files comprises at least one of. one or more installation files; or one or more links to one or more installation files.

Referring now to FIG. 10, the step 1002 comprises receiving, at a client device, a first identifier of a first update channel for a software application. The client device may be implemented by the computing device 200 of FIG. 2. In some implementations, the software application is a component of a video conferencing software platform. In some implementations, the first identifier comprises a random or pseudorandom string of alphanumeric characters. In some implementations, the first identifier is received via an administrative configuration setting of the client device. In some implementations, the first identifier is received via GPO or MSI flag or a PLIST.

The step 1004 comprises sending, by the client device to an update server, a query comprising the first identifier. The update server may be implemented by the application server 108 and/or the database server 110 of FIG. 1. In some implementations, the sending of the query is in response to the software application launching on the client device. In some implementations, the sending of the query is in response to the client device booting up. In some implementations, the method further comprises repeating the sending of the query at one or more predefined intervals.

The step 1006 comprises receiving, at the client device from the update server, an indication of a first version of the software application associated with the first identifier. In some implementations, the method further comprises sending, by the client device to the update server, an indication of a currently installed first operating system on the client device, wherein the indication of the first version is based on the indication of the first operating system.

The step 1008 comprises determining, by the client device, whether a currently installed version of the software application on the client device matches the first version. This determining may be performed by a processor such as the processor 202 of FIG. 2.

The step 1010 comprises, in response to determining that the currently installed version does not match the first version, sending, by the client device to the update server, a request for installation of the first version.

The step 1012 comprises receiving, at the client device from the update server, an indication of one or more first installation files for the first version. In some implementations, the method further comprises installing the first version on the client device according to the indication of one or more first installation files. In some implementations, the indication of one or more first installation files comprises at least one of: one or more installation files; or one or more links to one or more installation files.

Some implementations of custom private software channels disclosed herein include a method, comprising: receiving a first input indicating a first update channel for a software application; associating a first identifier with the first update channel; receiving one or more second inputs indicating one or more first versions of the software application for the first update channel; associating the first identifier with the one or more first versions; receiving, from a first client device configured with the first identifier, a first query comprising the first identifier; sending, to the first client device in response to the first query, an indication of an identified first version of the one or more first versions; receiving, from the first client device, a first request to install the identified first version on the first client device; and sending, to the first client device in response to the first request, an indication of one or more first installation files for the identified first version.

In some implementations, the method further comprises: receiving a third input indicating a second update channel for the software application; associating a second identifier with the second update channel; receiving one or more fourth inputs indicating one or more second versions of the software application for the second update channel; associating the second identifier with the one or more second versions; receiving, from a second client device configured with the second identifier, a second query comprising the second identifier; sending, to the second client device in response to the second query, an indication of an identified second version of the one or more second versions; receiving, from the second client device, a second request to install the identified second version on the second client device; and sending, to the second client device in response to the second request, an indication of one or more second installation files for the identified second version.

In some implementations, the method further comprises: receiving one or more third inputs indicating one or more second versions of the software application for the first update channel; disassociating the first identifier from the one or more first versions and associating the first identifier with the one or more second versions; receiving, from the first client device, a second query comprising the first identifier; sending, to the first client device in response to the second query, an indication of an identified second version of the one or more second versions; receiving, from the first client device, a second request to install the identified second version on the first client device; and sending, to the first client device in response to the second request, an indication of one or more second installation files for the identified second version.

In some implementations, the indication of one or more first installation files comprises at least one of: one or more installation files; or one or more links to one or more installation files.

In some implementations, each second input comprises selecting a respective first version from a respective set of currently available versions of the software application associated with a respective operating system.

In some implementations, the method further comprises: associating, via each second input, a respective first version with a respective operating system; receiving, from the first client device, an indication of a first operating system installed on the first client device; and determining the identified first version as an individual one of the one or more first versions that is associated with an individual one of the respective operating systems that matches the indication of the first operating system.

In some implementations, the method further comprises: receiving the first query at one or more predefined intervals.

In some implementations, the method further comprises: receiving the first query in response to the software application launching on the first client device.

In some implementations, the software application is a component of a video conferencing software platform.

In some implementations, the method further comprises: generating the first identifier as a random or pseudorandom string of alphanumeric characters.

In some implementations, the method further comprises: serving a graphical user interface (GUI) for receiving the first input and the one or more second inputs.

In some implementations, the indication of the identified first version comprises an alphanumeric description of the identified first version.

Some implementations of custom private software channels disclosed herein include a non-transitory computer-readable medium storing instructions operable to cause one or more processors to perform operations comprising: receiving a first input indicating a first update channel for a software application; associating a first identifier with the first update channel; receiving one or more second inputs indicating one or more first versions of the software application for the first update channel; associating the first identifier with the one or more first versions; receiving, from a first client device configured with the first identifier, a first query comprising the first identifier; sending, to the first client device in response to the first query, an indication of an identified first version of the one or more first versions; receiving, from the first client device, a first request to install the identified first version on the first client device; and sending, to the first client device in response to the first request, an indication of one or more first installation files for the identified first version.

In some implementations, the operations further comprise: receiving one or more third inputs indicating one or more second versions of the software application for the first update channel; disassociating the first identifier from the one or more first versions and associating the first identifier with the one or more second versions; receiving, from the first client device, a second query comprising the first identifier; sending, to the first client device in response to the second query, an indication of an identified second version of the one or more second versions; receiving, from the first client device, a second request to install the identified second version on the first client device; and sending, to the first client device in response to the second request, an indication of one or more second installation files for the identified second version.

In some implementations, the first client device was configured with the first identifier via a group policy object (GPO), a Microsoft standard installer (MSI) flag, or a property list (PLIST).

In some implementations, the operations further comprise: receiving the first query in response to the first client device booting up.

Some implementations of custom private software channels disclosed herein include a system, comprising: one or more memories; and one or more processors configured to execute instructions stored in the one or more memories to: receive a first input indicating a first update channel for a software application; associate a first identifier with the first update channel; receive one or more second inputs indicating one or more first versions of the software application for the first update channel; associate the first identifier with the one or more first versions; receive, from a first client device configured with the first identifier, a first query comprising the first identifier; send, to the first client device in response to the first query, an indication of an identified first version of the one or more first versions; receive, from the first client device, a first request to install the identified first version on the first client device; and send, to the first client device in response to the first request, an indication of one or more first installation files for the identified first version.

In some implementations, the instructions include instruction to: receive one or more third inputs indicating one or more second versions of the software application for the first update channel; disassociate the first identifier from the one or more first versions and associating the first identifier with the one or more second versions; receive, from the first client device, a second query comprising the first identifier; send, to the first client device in response to the second query, an indication of an identified second version of the one or more second versions; receive, from the first client device, a second request to install the identified second version on the first client device; and send, to the first client device in response to the second request, an indication of one or more second installation files for the identified second version.

In some implementations, the first input comprises alphanumeric characters that represent a human-readable name of the first update channel; and the first identifier comprises a random or pseudorandom string of alphanumeric characters.

In some implementations, each second input indicates a first version selected from a respective set of versions of the software application, associated with a respective operating system, that was released within predefined date range.

Some implementations of custom private software channels disclosed herein include a method, comprising: receiving, at a client device, a first identifier of a first update channel for a software application; sending, by the client device to an update server, a query comprising the first identifier; receiving, at the client device from the update server, an indication of a first version of the software application associated with the first identifier; determining, by the client device, whether a currently installed version of the software application on the client device matches the first version; in response to determining that the currently installed version does not match the first version, sending, by the client device to the update server, a request for installation of the first version; and receiving, at the client device from the update server, an indication of one or more first installation files for the first version.

In some implementations, the method further comprises: receiving, at the client device, a second identifier of a second update channel for the software application; sending, by the client device to the update server, a query comprising the second identifier; receiving, at the client device from the update server, an indication of a second version of the software application associated with the second identifier; determining, by the client device, whether the currently installed version of the software application on the client device matches the second version; in response to determining that the currently installed version does not match the second version, sending, by the client device to the update server, a request for installation of the second version; and receiving, at the client device from the update server, an indication of one or more second installation files for the second version.

In some implementations, the method further comprises: sending, by the client device to the update server, an indication of a currently installed first operating system on the client device; wherein the indication of the first version is based on the indication of the first operating system.

In some implementations, the sending of the query is in response to the software application launching on the client device.

In some implementations, the method further comprises: repeating the sending of the query at one or more predefined intervals.

In some implementations, the method further comprises: storing, in a memory of the client device, the first identifier.

In some implementations, the method further comprises: receiving, at the client device, a first input selecting the first update channel from a set of update channels.

In some implementations, the method further comprises: receiving, at the client device, the first identifier via a group policy object (GPO), a Microsoft standard installer (MSI) flag, or a property list (PLIST).

In some implementations, the software application is a component of a video conferencing software platform.

In some implementations, the method further comprises: installing the first version on the client device according to the indication of one or more first installation files; wherein the indication of one or more first installation files comprises at least one of: one or more installation files; or one or more links to one or more installation files.

In some implementations, the first identifier comprises a random or pseudorandom string of alphanumeric characters.

In some implementations, the sending of the query is in response to the client device booting up.

Some implementations of custom private software channels disclosed herein include a non-transitory computer-readable medium storing instructions operable to cause one or more processors to perform operations comprising: receiving, at a client device, a first identifier of a first update channel for a software application; sending, by the client device to an update server, a query comprising the first identifier; receiving, at the client device from the update server, an indication of a first version of the software application associated with the first identifier; determining, by the client device, whether a currently installed version of the software application on the client device matches the first version; in response to determining that the currently installed version does not match the first version, sending, by the client device to the update server, a request for installation of the first version; and receiving, at the client device from the update server, an indication of one or more first installation files for the first version.

In some implementations, the operations further comprise: receiving, at the client device, a first input selecting the first update channel from a set of update channels presented by a graphical user interface (GUI).

In some implementations, the operations further comprise: receiving, at the client device, a second input selecting a second update channel from a set of update channels; receiving, at the client device, a second identifier of the second update channel; sending, by the client device to the update server, a query comprising the second identifier; receiving, at the client device from the update server, an indication of a second version of the software application associated with the second identifier; determining, by the client device, whether the currently installed version of the software application on the client device matches the second version; in response to determining that the currently installed version does not match the second version, sending, by the client device to the update server, a request for installation of the second version; and receiving, at the client device from the update server, an indication of one or more second installation files for the second version.

In some implementations, the operations further comprise: resending the query after one or more predefined intervals.

Some implementations of custom private software channels disclosed herein include a system, comprising: one or more memories; and one or more processors configured to execute instructions stored in the one or more memories to: receive, at a client device, a first identifier of a first update channel for a software application; send, by the client device to an update server, a query comprising the first identifier; receive, at the client device from the update server, an indication of a first version of the software application associated with the first identifier; determine, by the client device, whether a currently installed version of the software application on the client device matches the first version; in response to determining that the currently installed version does not match the first version, send, by the client device to the update server, a request for installation of the first version; and receive, at the client device from the update server, an indication of one or more first installation files for the first version.

In some implementations, the instruction include instructions to: receive, at the client device, a first input selecting the first update channel from a subset of a set of update channels, wherein the subset is specific to the client device.

In some implementations, the instruction include instructions to: receive, at the client device, the first identifier via an administrative configuration setting of the client device.

In some implementations, the instructions to send the query is in response to one or more of: the client device booting up; or the software application launching on the client device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, at a client device, a first identifier of a first update channel for a software application, wherein the first update channel is one of a set of update channels for the software application, each update channel having been defined by one or more configuration inputs received by an update server, the one or more configuration inputs assigning a channel name to each update channel and selecting a specific version of the software application for each update channel;

sending, by the client device to the update server, a query comprising the first identifier;

receiving, at the client device from the update server, an indication of a first version of the software application associated with the first identifier;

determining, by the client device, whether a currently installed version of the software application on the client device matches the first version;

in response to determining that the currently installed version does not match the first version, sending, by the client device to the update server, a request for installation of the first version; and receiving, at the client device from the update server, an indication of one or more first installation files for the first version.

2. The method of claim 1, further comprising:

receiving, at the client device, a second identifier of a second update channel for the software application, wherein the second update channel is one of the set of update channels for the software application;

sending, by the client device to the update server, a query comprising the second identifier;

receiving, at the client device from the update server, an indication of a second version of the software application associated with the second identifier;

determining, by the client device, whether the currently installed version of the software application on the client device matches the second version;

in response to determining that the currently installed version does not match the second version, sending, by the client device to the update server, a request for installation of the second version; and receiving, at the client device from the update server, an indication of one or more second installation files for the second version.

3. The method of claim 1, further comprising:

sending, by the client device to the update server, an indication of a currently installed first operating system on the client device; wherein the indication of the first version is based on the indication of the first operating system.

4. The method of claim 1, wherein:

the sending of the query is in response to the software application launching on the client device.

5. The method of claim 1, further comprising:

repeating the sending of the query at one or more predefined intervals.

6. The method of claim 1, further comprising:

storing, in a memory of the client device, the first identifier.

7. The method of claim 1, further comprising:

receiving, at the client device, a first input selecting the first update channel from the set of update channels.

8. The method of claim 1, further comprising:

receiving, at the client device, the first identifier via a group policy object (GPO), a Microsoft standard installer (MSI) flag, or a property list (PLIST).

9. The method of claim 1, wherein:

the software application is a component of a video conferencing software platform.

10. The method of claim 1, further comprising:

installing the first version on the client device according to the indication of one or more first installation files; wherein the indication of one or more first installation files comprises at least one of:

one or more installation files; or one or more links to one or more installation files.

11. The method of claim 1, wherein:

the first identifier comprises a random or pseudorandom string of alphanumeric characters.

12. The method of claim 1, wherein:

the sending of the query is in response to the client device booting up.

13. A non-transitory computer-readable medium storing instructions operable to cause one or more processors to perform operations comprising:

receiving, at a client device, a first identifier of a first update channel for a software application, wherein the first update channel is one of a set of update channels for the software application, each update channel having been defined by one or more configuration inputs received by an update server, the one or more configuration inputs assigning a channel name to each update channel and selecting a specific version of the software application for each update channel;

sending, by the client device to the update server, a query comprising the first identifier;

receiving, at the client device from the update server, an indication of a first version of the software application associated with the first identifier;

determining, by the client device, whether a currently installed version of the software application on the client device matches the first version;

in response to determining that the currently installed version does not match the first version, sending, by the client device to the update server, a request for installation of the first version; and receiving, at the client device from the update server, an indication of one or more first installation files for the first version.

14. The medium of claim 13, the operations further comprising:

receiving, at the client device, a first input selecting the first update channel from the set of update channels presented by a graphical user interface (GUI).

15. The medium of claim 13, the operations further comprising:

receiving, at the client device, a second input selecting a second update channel from the set of update channels;

receiving, at the client device, a second identifier of the second update channel;

sending, by the client device to the update server, a query comprising the second identifier;

receiving, at the client device from the update server, an indication of a second version of the software application associated with the second identifier;

determining, by the client device, whether the currently installed version of the software application on the client device matches the second version;

in response to determining that the currently installed version does not match the second version, sending, by the client device to the update server, a request for installation of the second version; and receiving, at the client device from the update server, an indication of one or more second installation files for the second version.

16. The medium of claim 13, the operations further comprising:

resending the query after one or more predefined intervals.

17. A system, comprising:

one or more memories; and one or more processors configured to execute instructions stored in the one or more memories to:

receive, at a client device, a first identifier of a first update channel for a software application, wherein the first update channel is one of a set of update channels for the software application, each update channel having been defined by one or more configuration inputs received by an update server, the one or more configuration inputs assigning a channel name to each update channel and selecting a specific version of the software application for the update channel;

send, by the client device to the update server, a query comprising the first identifier;

receive, at the client device from the update server, an indication of a first version of the software application associated with the first identifier;

determine, by the client device, whether a currently installed version of the software application on the client device matches the first version;

in response to determining that the currently installed version does not match the first version, send, by the client device to the update server, a request for installation of the first version; and receive, at the client device from the update server, an indication of one or more first installation files for the first version.

18. The system of claim 17, the instructions including instructions to:

receive, at the client device, a first input selecting the first update channel from a subset of the set of update channels, wherein the subset is specific to the client device.

19. The system of claim 17, the instructions including instructions to:

receive, at the client device, the first identifier via an administrative configuration setting of the client device.

20. The system of claim 17, wherein the instructions to send the query is in response to one or more of:

the client device booting up; or the software application launching on the client device.

* * * * *